Jan. 13, 1948. H. J. LE VESCONTE 2,434,325
INTERMITTENT FEED HIGH-FREQUENCY ELECTRICAL APPARATUS
FOR UNITING DIELECTRIC MATERIALS
Filed Sept. 9, 1944 5 Sheets-Sheet 1
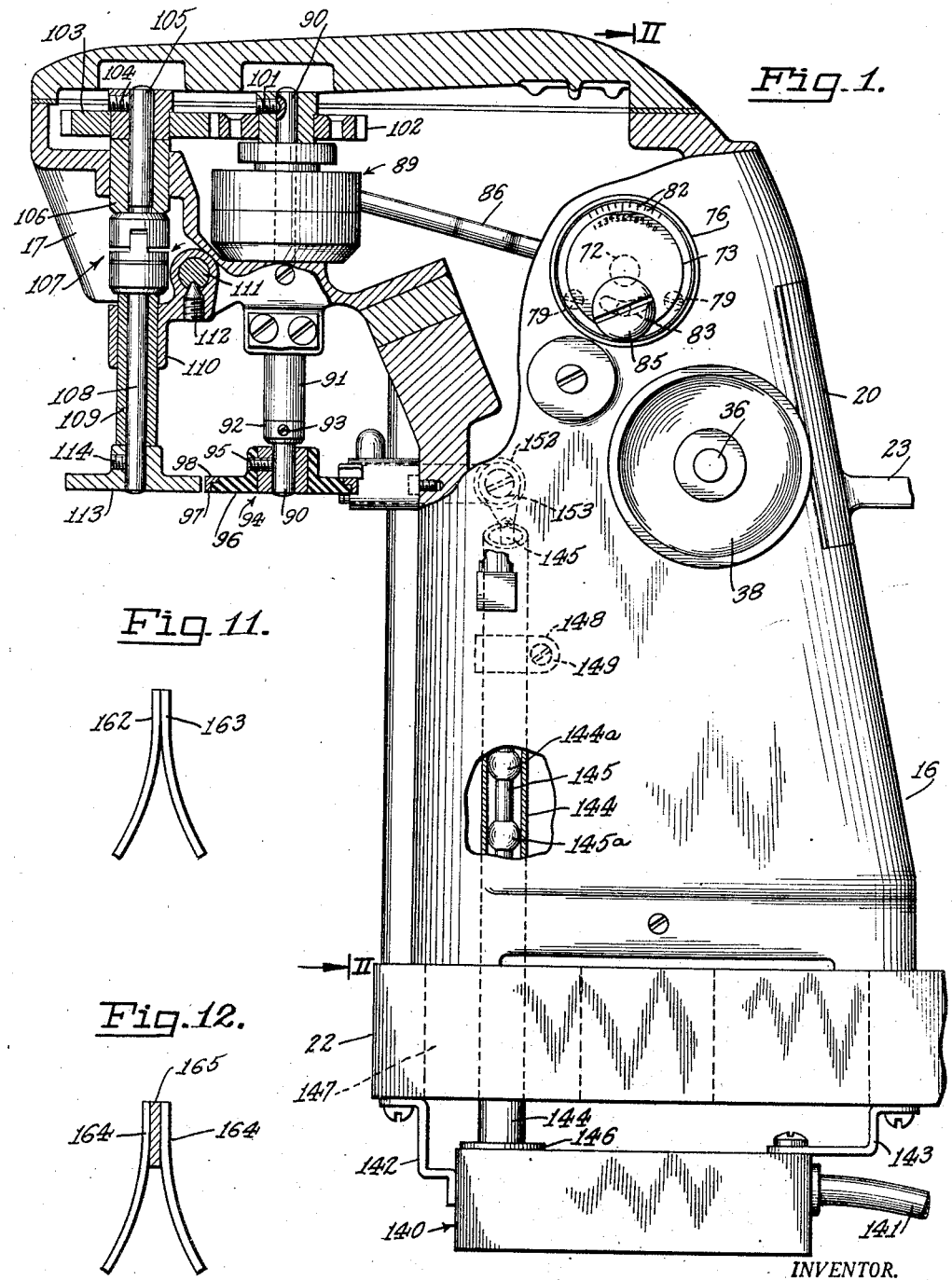
INVENTOR.
HAROLD J. LE VESCONTE
BY
ATTORNEY

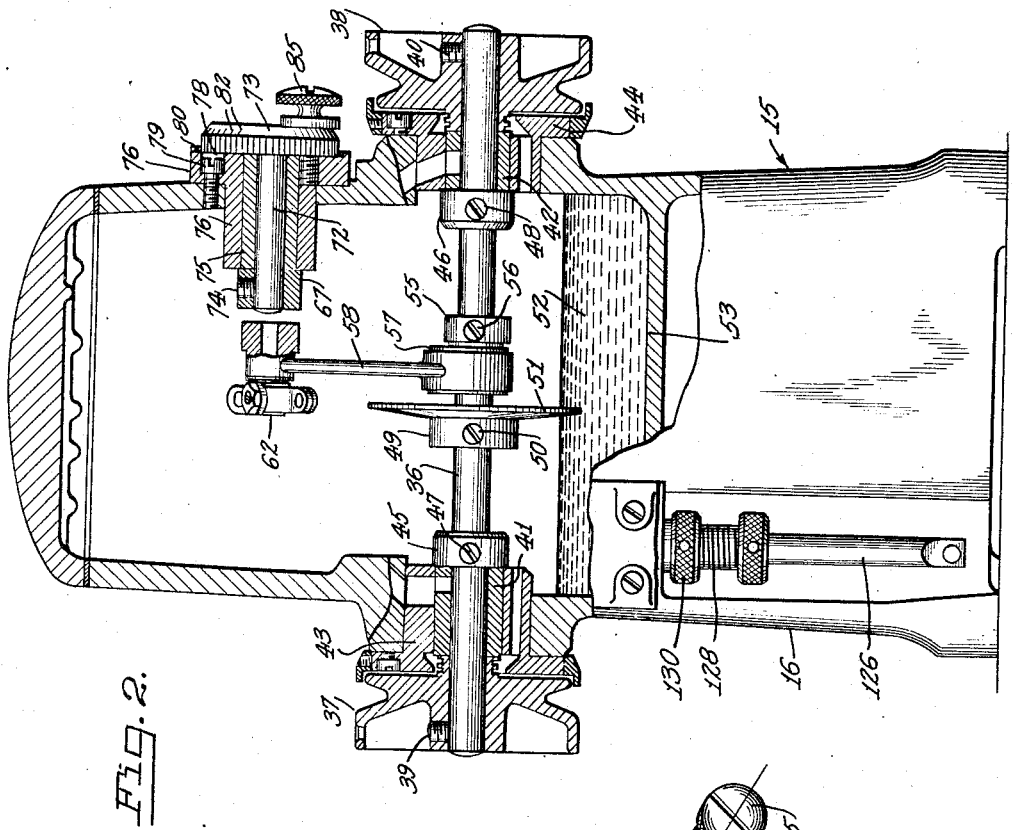
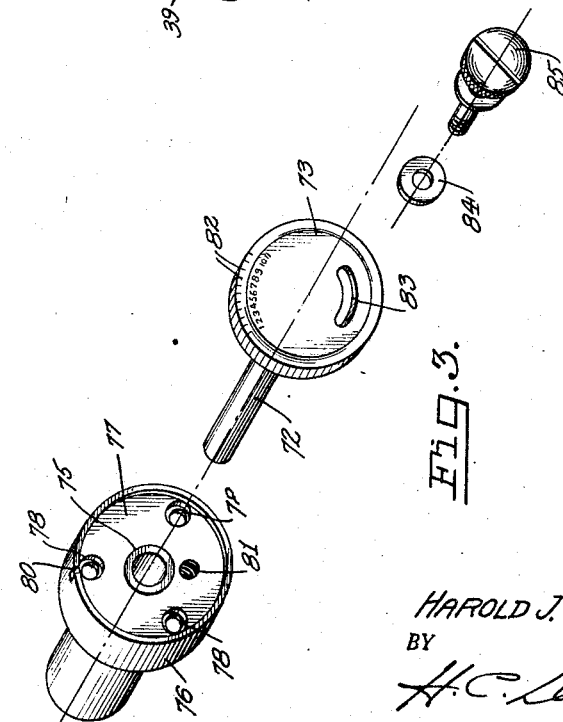
INVENTOR.
HAROLD J. LE VESCONTE
BY
ATTORNEY

Jan. 13, 1948. H. J. LE VESCONTE 2,434,325
INTERMITTENT FEED HIGH-FREQUENCY ELECTRICAL APPARATUS
FOR UNITING DIELECTRIC MATERIALS
Filed Sept. 9, 1944 5 Sheets-Sheet 4
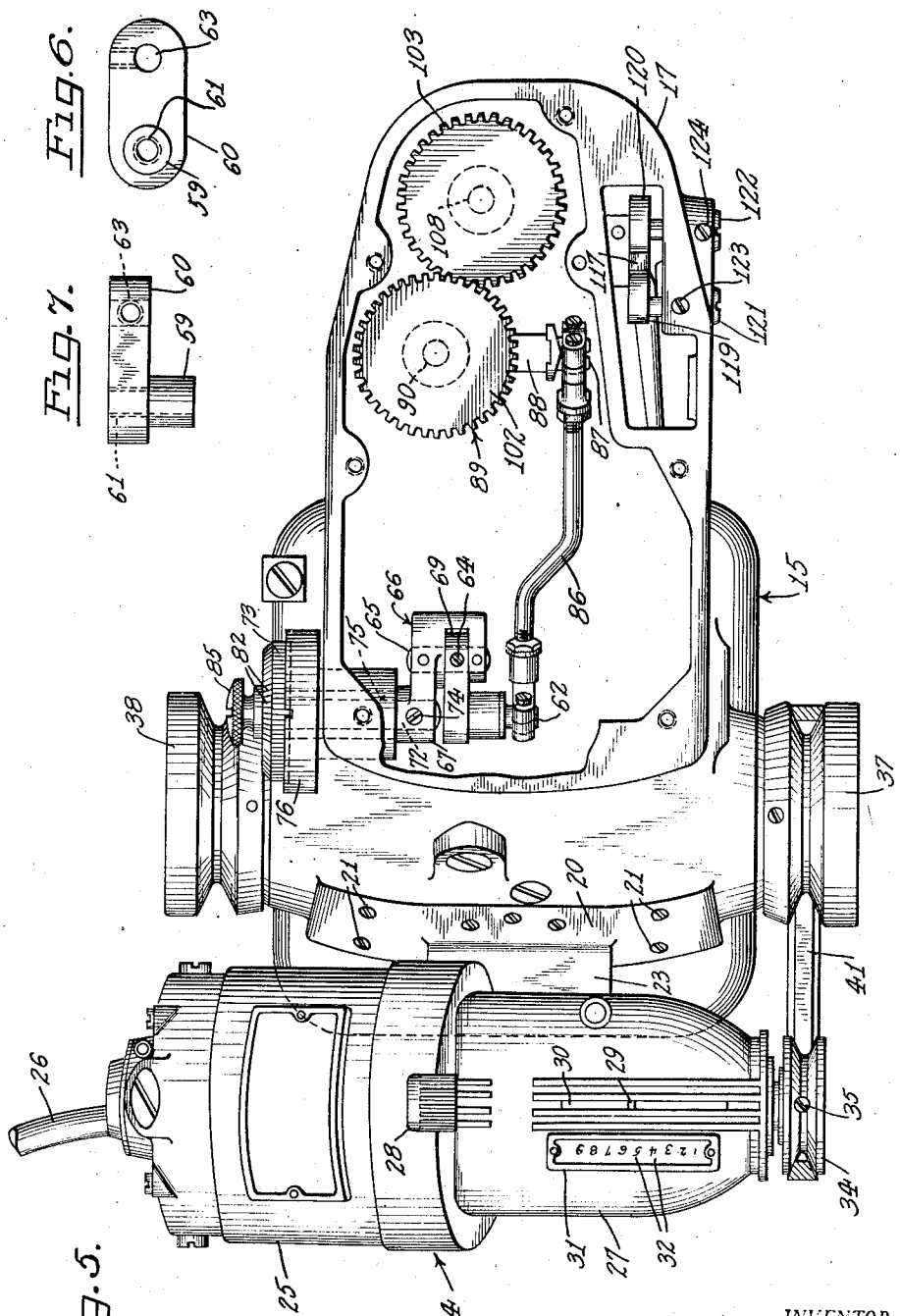
INVENTOR.
HAROLD J. LE VESCONTE
BY
ATTORNEY

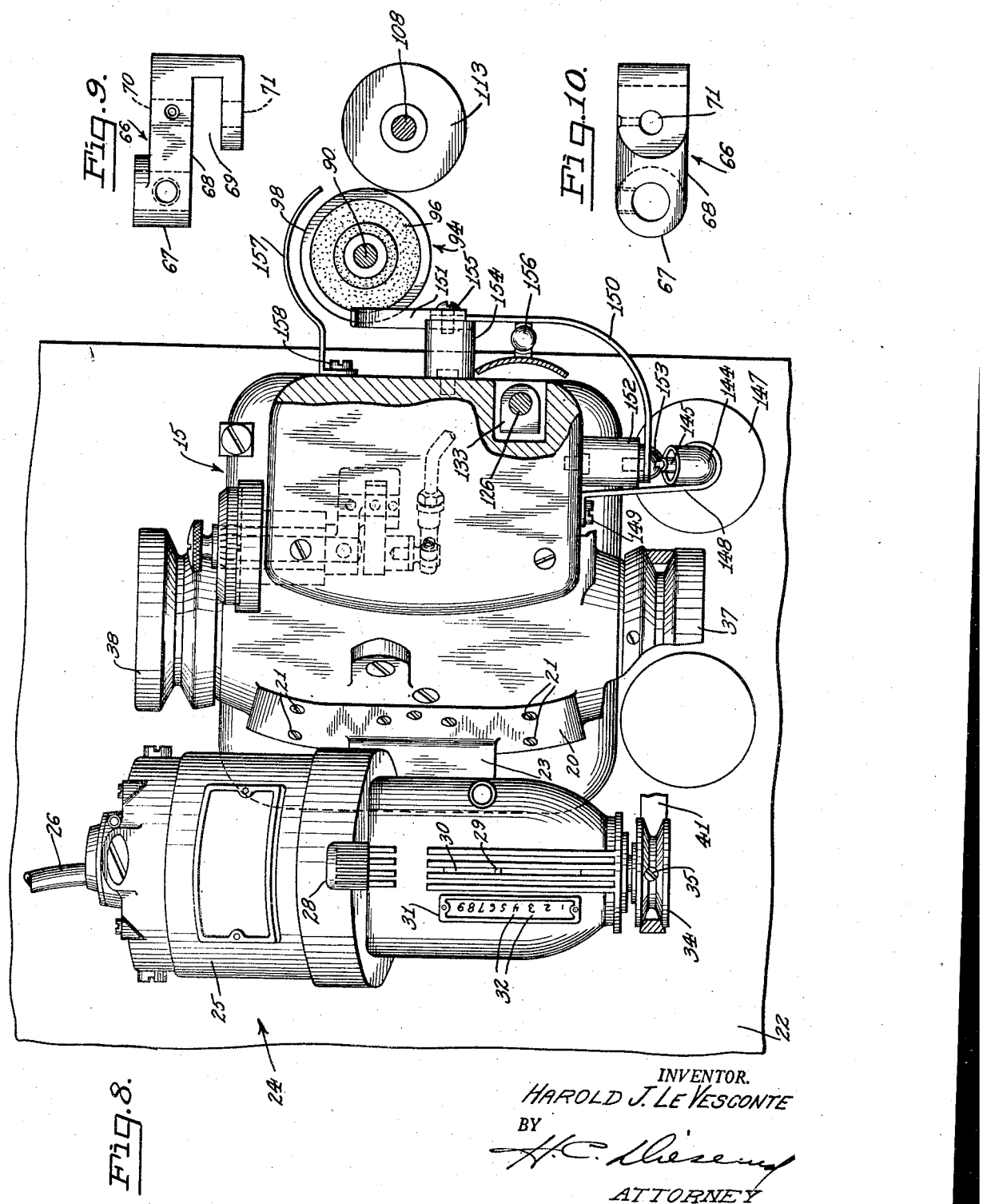

Patented Jan. 13, 1948

2,434,325

UNITED STATES PATENT OFFICE 2,434,325

INTERMITTENT FEED HIGH-FREQUENCY ELECTRICAL APPARATUS FOR UNITING DIELECTRIC MATERIALS

Harold J. Le Vesconte, Glendale, Calif., assignor to Union Special Machine Company, Chicago, Ill., a corporation of Illinois Application September 9, 1944, Serial No. 553,443

4 Claims. (Cl. 219—47)

This invention relates to apparatus for electrically uniting or bonding together two or more materials at least one of which becomes plastic upon being subjected to heat and pressure. The present invention concerns what may be properly considered as being in the nature of an electronic sewing machine in that it utilizes an ultra high frequency electric current to obtain an effective and adequate bonding together of two or more superposed layers of the materials that are to be united.

It is the primary object of this invention to provide suitable, trouble-free apparatus having certain work-advancing parts which are actuated intermittently in the course of operation of the electronic seaming devices to electrically obtain an effective and efficient joining together of two or more layers of material, at least one of which is thermoplastic in character.

Another object of this invention is to improve the character of the seam resulting from the operation of the apparatus of the type indicated by the provision of certain parts so arranged as to bring about the intermittent feeding and joining together of the materials under consideration. A more effective and more rapid union of the materials to be united is brought about through the stitching effect provided by the intermittent advance of the work.

This invention has for another object the provision of intermittent feed electrical uniting apparatus that is particularly adapted for and may be advantageously employed in uniting and sealing the closure portions of bags, packaged articles and the like.

A further object of this invention is to provide apparatus of the character indicated above, which is sturdy in design and construction, and reasonable in initial and operating costs. By virtue of the relatively few moving parts employed in accordance with this invention and the relationship of these parts to each other, maintenance costs are reduced to a minimum.

In accordance with my instant invention, an appropriate high frequency current is supplied to a pair of wheels or rollers constituting electrodes that are suspended and arranged to rotate in opposite directions on substantially vertical and parallel axes and that have their peripheral surfaces closely adjacent, but spaced apart at all times to prevent direct contact therebetween, even when not separated by work. The supporting structure for the wheels is positioned above and to one side of the wheels, thereby leaving a clear space below the wheels and permitting the materials to be bonded to extend below the wheels and be fed therebetween. The apparatus includes means for imparting intermittent rotation to both wheels simultaneously, which means is disposed within a housing and is adjustable from the exterior of the housing.

The aforementioned, as well as other objects, together with the numerous advantages that may be attained by the practice of this invention, will be readily apparent to persons skilled in the art from the following detailed description, taken in conjunction with the annexed drawings, which respectively describe and illustrate a preferred embodiment of the invention, and wherein.

Figure 1 is a side elevational view, partly in vertical cross-section, of a machine embodying the invention, with certain parts omitted;

Figure 2 is a view partly in side elevation and partly in section taken along line II—II of Figure 1;

Figure 3 is a disassembled perspective view of the various parts of an adjusting mechanism, shown in assembled and operative relationship in Figure 2;

Figure 5 is a top plan view of the apparatus depicted in Figure 4 with the top cover plate removed;

Figures 6 and 7 are two views of a link or arm employed in the illustrated embodiment of the invention;

Figure 8 is a top plan view, similar to Figure 5, but with certain parts removed;

Figures 9 and 10 are two views of a connector used in the illustrated embodiment of the invention; and Figures 11 and 12 illustrate materials to be bonded together by the apparatus of this invention.

Figure 4:
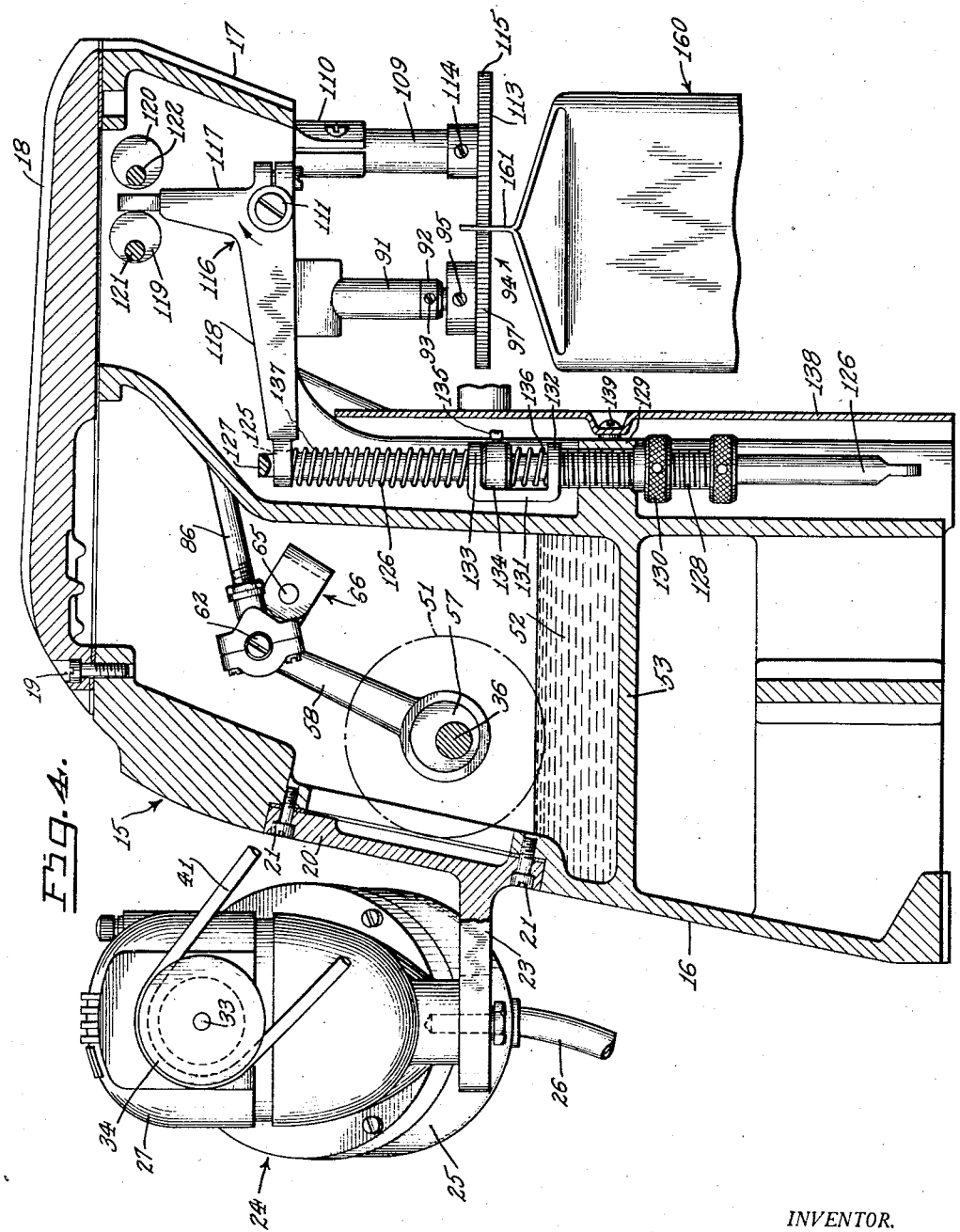
Figure 4 is a side elevational view taken 180° to Figure 1, partly in cross-section. Certain parts omitted in Figure 1 are illustrated in Figure 4, while certain other parts shown in Figure 1 are omitted in Figure 4.

Referring now more particularly to the drawings, wherein like reference numerals are used to designate corresponding parts throughout the several views, numeral 15 generally indicates a housing, formed preferably as a metallic casting and consisting of an upstanding hollow base 16 and an overhanging bracket arm 17. A readily removable top cover plate 18 is secured to bracket arm 17 by means of a plurality of stud bolts 19, while a rear cover plate 20 is similarly removably secured to base 16 by a plurality of stud bolts 21. As will be observed in Figures 1 and 8, housing 15 is adapted to be mounted on a table or other appropriate support 22. Integral with rear cover plate 20 is a bracket 23 that carries a variable speed driving unit 24 consisting of a suitable electric motor 25, which is supplied with electrical energy from a convenient source (not shown) by a conductor cable 26, and a conventional speed controller 27 in the transmission from the motor. Speed controller 27 is provided with a rotatable knob 28 for manually adjusting the same; this knob actuates an indicator pointer 29 that is adapted to ride in a slot 30. A plate 31 is carried by speed controller 27, parallel to slot 30, and is provided with graduations or like indicia 32 that serve as visual aids in the adjustment of the speed of unit 24. A drive shaft 33, extending through and beyond unit 24, carries a drive pulley 34 which is affixed thereto by means of a set screw 35. A horizontally disposed driven shaft 36 extends through and beyond the confines of hollow base 16 (Fig. 2) and has combined hand-wheels and pulleys 37 and 38 secured to its opposite ends by set screws 39 and 40, respectively. An open V-belt 41 transmits rotational energy from drive pulley 34 to combined hand-wheel and pulley 37 to thereby impart rotation to driven shaft 36. As is depicted in Figure 2, shaft 36 is rotatable in sleeve bearings 41 and 42 which are mounted in bearing housings 43 and 44, respectively. Shaft 36 is restrained from axial movement by collars 45 and 46 that are maintained in desired position by set screws 47 and 48, respectively. Another collar 49, that is attached to shaft 36 by a set screw 50, carries a frusto-conical flange 51, the lower portion of which flange is immersed in a pool of a suitable liquid lubricant 52, such as an oil, that is contained in a well, formed by a horizontal partition 53 and the internal side walls of base 16. Flange 51, as it rotates with shaft 36, picks up small quantities of oil in the course of its movement through pool 52 and throws the oil by centrifugal action to all parts of the interior of the upper portion of base 16, thereby lubricating the apparatus disposed therein.

Now follows a description of a mechanism actuated by shaft 36 and adapted to impart intermittent or step by step rotation to a pair of wheels or rotary electrodes which will be subsequently discussed. This includes a collar 55 that is secured to shaft 36 by a set screw 56 and that has an eccentric 57 formed integral therewith and hence rotatable with shaft 36. One end of a pitman 58 is formed as a strap which embraces eccentric 57, while the other end embraces a leg or stud 59 that is integral with or otherwise secured to and extends at a right angle from a link 60 which, as shown in Figures 6 and 7, is provided with bores 61 and 63. A ball stud 62 is disposed in bore 61 and projects beyond the free end of leg 59. A set screw 64 connects one end of link 60 to a pin 65 which extends through and beyond each end of bore 63. A connector 66 receives the ends of pin 65 as shown in Figures 4 and 5. Two views of this connector are depicted in Figures 9 and 10, wherein there is illustrated a collar 67 from which extends an arm 68 that is recessed at 69. Arm 68 is provided with co-axial bores 70 and 71 for receiving and freely supporting the end portions of pin 65.

A stem 72 that carries a serrated adjusting disc 73 at one end has fastened to it, at its other end, a collar 67 which is secured by a set screw 74. Stem 72 is mounted in a bearing sleeve 75 which is carried by a housing 76 that has a recess 77 in its enlarged outer end for the partial reception of disc 73. Housing 76 is provided with a plurality of preferably equidistant openings 78 which receive the shank and head portions of stud bolts 79 whereby housing 76 is rigidly attached to hollow standard 16. An indicator notch 80 and a tapped opening 81 are provided in housing 76. One of the openings 78, notch 80 and tapped opening 81 are preferably all positioned on the vertical diameter of the outer end of housing 76, as illustrated in Figure 3. The outer end surface of disc 73 carries appropriate graduations or the like which cooperate with notch 80 to indicate the angular position of connector 66 with respect to the frame of the machine or a vertical plane through the axis of stem 72. An arcuate slot 83 extends through disc 73, this slot being adapted to register with tapped opening 81. A knurled thumb screw 85 is arranged to extend through slot 83 and have threaded engagement with tapped opening 81. It will be observed that with the arrangement illustrated and described, adjusting disc 73 may be rotated about its axis to the extent allowed by slot 83. It may be locked in any set position by tightening the thumb screw 85. A washer 84 is preferably provided between the head of the thumb screw and the face of disc 73.

A rod 86, that is adjustable in length, is coupled at one end to ball stud 62 and at its other end to a second ball stud 87 at the outer end of an arm 88 which is operatively connected to a one-way clutch mechanism, of a type known to the art, and generally denoted by numeral 89. Clutch mechanism 89 may be of the same construction as the one illustrated and described in Hacklander Patent 2,043,749.

Secured to the driven member of clutch 89 and rotatable therewith is a shaft 90 that is journaled in a bushing 91. A collar 92 abutting the lower end of bushing 91 is attached to shaft 90 by a set screw 93 and serves to hold the clutch assembly against axial movement. Numeral 94 generally designates a wheel or roller which serves as one of the rotary electrodes employed with this invention and which is attached to the lower end of shaft 90 by a set screw 95. Wheel 94 comprises a hub and main body portion 96 that is made of a suitable electrical insulating material and a metallic rim having good electrical conductive properties and consisting of an annular ring 97 that constitutes the periphery of wheel 94, and an inwardly extending radial flange 98 integral with ring 97.

Secured to the upper end of shaft 90 by a set screw 101 is a gear wheel 102, preferably composed of a non-conducting, laminated or fibrous, molded or plastic material, which meshes with a second gear wheel 103, of like size and of the same or similar composition, which is connected by a set screw 104 to the upper end of a stub shaft 105. Stub shaft 105 is rotatable in a bushing 106 and is connected at its lower end to the upper member of a universal or floating coupling 107, the lower member of which in turn is connected to the upper end of a shaft 108. Shaft 108 is rotatable in a corresponding bushing 109 that is carried by a bracket 110 attached to a horizontal rock shaft 111 by a set screw 112. A second wheel or roller 113, which serves as the other rotary electrode of this invention, is fastened to the lower end of shaft 108 by a set screw 114. Wheel 113 possesses good electrical conductive properties and is preferably of the same size and configuration as wheel 94 described above.

The peripheral surface of each of the wheels or rotary electrodes 94 and 113 is preferably smooth, but may be serrated or otherwise roughened slightly, if desired, in order to provide adequate traction in feeding the materials to be joined together in the manner to be explained.

Disposed within a partially enclosed space in the overhanging bracket arm 17, but outside of the lubricant-containing chamber thereof, and clamped to shaft 111 is an L-shaped lever 116, consisting of a vertical arm 117 and a horizontal arm 118 (see Fig. 4). The free end of arm 117 is located between a pair of eccentric stops 119 and 120 which are attached to the inner portions of a pair of studs 121 and 122, respectively, having slotted heads accessible from the exterior of the frame. The gap between the peripheries of the eccentric stops, along a line through the axes of studs 121 and 122, and the location of this gap may be readily varied by turning either or both of the studs a desired predetermined extent to thereby adjust the throw of the upper end of vertical arm 117 and to alter the position of its range of movement. Studs 121 and 122 are maintained in desired position by set screws 123 and 124, respectively. The free end of horizontal arm 118 has a vertical opening 125 through which a pull rod 126 is freely slidable. The upper end of pull rod 126 carries a head 127 of such size and shape as to bear upon horizontal arm 118, upon predetermined downward movement of rod 126. Rod 126 is slidable through an adjusting sleeve 128 which is in threaded engagement with a projection 129 of base 16. This adjusting sleeve carries an internally threaded lock-nut 130 which bears against the under surface of projection 129. A U-shaped stop 131 is mounted on the upper end of sleeve 128 and is formed with a pair of horizontal legs 132 and 133 through which pull rod 126 is adapted to pass. (See Figs. 4 and 8). A collar 134 that is secured to rod 126 by a set screw 135 and a compression spring 136, concentric with rod 126, are located intermediate the legs of the U-stop and tend to normally urge pull rod 126 upwardly to maintain head 127 out of engagement with horizontal arm 118. A second compression spring 137, concentric with pull rod 126, bears against the upper surface of leg 133 of U-stop 131 and the under surface of the free end of arm 118 to normally tilt L-lever 116 in a clockwise direction (see Fig. 4) and cause the free end of arm 117 to bear against stop 120. It will be observed that at this time shaft 111, which is coupled to lever 116, tends to also rotate in a clockwise direction as indicated by the arrow in Figure 4. As viewed in Figure 1 this arrangement normally tends to rotate shaft 111 in a counter-clockwise direction, as indicated by the arrow, thereby actuating bracket 110 and urging the peripheral surface of rotary electrode 113 to its nearest position with respect to the peripheral surface of rotary electrode 94. These peripheral surfaces are preferably never permitted to come in direct contact with each other but are spaced a suitable distance as controlled by vertical arm 117 of L-lever 116 and eccentric stop 120.

The operator may impart a downward pull to rod 126 by any suitable means, such as a treadle actuated connection (not shown). This serves to swing the wheel 113 outwardly away from wheel 94 to facilitate the introduction of work between them. So also the wheel 113 is permitted to swing outwardly as required to accommodate different thicknesses of the work. As the work is being acted upon, the wheel 113 will be urged yieldingly against it and toward the roller 94 by the spring 137. Access to adjusting sleeve 128 and the other parts associated with pull rod 126 may be readily had by simply removing a cover plate 138 which is attached to projection 129 by a screw 139.

Referring next to Figures 1 to 8, I have illustrated therein means for supplying a suitable high frequency current to rotary electrodes 94 and 113. This means includes a high frequency oscillation generator 140, of any suitable construction that is connected to a source of electrical supply (not shown) by a conductor cable 141 and that is disposed below and secured to the under surface of table 22 by a pair of brackets 142 and 143. Concentric lines, consisting of an outer tubular conductor 144 and an inner conductor 145 that emerge from generator 140 at 146, pass through an opening 147 in table 22 and conduct the high frequency current to wheels 94 and 113 in a manner now to be explained.

Tubular conductor 144 is connected to base 16 by means of an electrically conductive bracket 148, that is attached to base 16 by a screw 149, and is, therefore, in electrical communication with outer wheel 113. Inner conductor 145, which is insulated from conductor 144 by means of insulators 145a, is in series electrical communication with a bar conductor 150, a spring strip conductor 151, and flange 98, in the order set forth, inner conductor 145 and bar conductor 150 being connected to an insulator 152 by means of a screw or terminal post 153, and bar conductor 150 and spring strip conductor 151 being connected to a similar insulator 154 by means of a screw or terminal post 155. Insulators 152 and 154 are secured in any convenient manner to hollow base 16. A small neon lamp 156 is in electrical communication with bar conductor 150 for the purpose of visually indicating the presence of high frequency current in the circuit. A curved guard 157, that is attached to the housing by a screw 158, is arranged in spaced relation to wheel 94 and serves to protect the operator's hand from coming in contact with said wheel.

For best results, the conducting means for transmitting the high frequency current from the oscillation generator to the rotary electrodes should preferably be equal in length to one-quarter of the wave length, at the operating frequency of oscillation generator 140, in order that maximum voltage may be applied to wheels 94 and 113. The most desirable frequency of the current supplied by oscillation generator 140 and the electrical power input to rotary electrodes 94 and 113 are factors which may be readily determined by persons skilled in the art and will depend to some extent upon the character of the materials to be joined together and the nature of the bond to be obtained.

A partially filled bag is generally indicated by numeral 160 in Figure 4. The upper end of the bag is folded or otherwise manipulated so as to obtain at 161 two or more portions in abutting relation, which portions are to be joined together by the apparatus of this invention. As was stated earlier herein, at least one of the materials to be united must be thermoplastic in composition. The upper part 161 of bag 160 may consist of two (2) dielectric materials 162 and 163 (Fig. 11), either or both of which may be thermoplastic, or may consist of two (2) dielectric non-thermoplastic materials 164 having a suitable thermoplastic material 165 interposed therebetween (Fig. 12). In either event, part 161 of the bag is introduced between rotary electrodes 94 and 113. Part 161 should be of greater thickness than the minimum spacing between the peripheral surfaces of the rotary electrodes with the result that when the same is introduced therebetween, rotary electrode 113 is yieldingly moved toward the right as viewed in Figure 4. Driving unit 24 and high frequency oscillation generator 140 are placed in service, the driving unit imparting intermittent or step by step rotation to rotary electrodes 94 and 113 through the medium of driven shaft 36, eccentric 57, clutch 89, and the devices interposed therebetween, as is more fully explained in the above-mentioned Hacklander patent.

The high frequency current supplied by oscillation generator 140 creates an electric field in the materials to be united in the region of their contact with the rotary electrodes, and the heat generated in the materials by this electric field causes the thermoplastic material to become sticky or tacky, whereby the materials are joined together. Due to the intermittent rotation of the rotary electrodes about their respective axes, it will be apparent that certain portions of the material will be subjected to heat for a shorter interval of time than other portions. In other words, as part 161 of the bag is being fed into and beyond the bight of the rollers in the course of each increment of rotation of the electrodes, the heat generated therein is of relatively short duration as compared to the heat generated when the rotary electrodes are at rest. This results in a series of alternate relatively less secure and more secure areas of adherence between the materials under consideration, the more secure areas of adherence being in the nature of "spot welds" or the seam as a whole being in the nature of a stitch bond. The magnitude of the increments of rotation of rotary electrodes 94 and 113 may be adjusted, as desired, by adjusting the "throw" of arm 68 during each revolution of shaft 36 as will be apparent to persons skilled in the art from the above description, taken in conjunction with the drawings, and as is more fully explained in said Hacklander patent. It will be understood that the electrically conductive portions of rotary electrodes 94 and 113 are likewise good heat conductors and therefore serve to prevent any overheating of the surfaces of the work directly engaged by the rotary electrodes.

From the foregoing it is believed that the construction, operation and advantages obtainable by the practice of my instant invention will be readily understood by persons skilled in the art. It is to be borne in mind, however, that various changes in the apparatus, herewith illustrated and described, may be resorted to without departing from the spirit of the invention or the scope of the subjoined claims.

I claim:

1. Apparatus of the character described comprising a housing including a generally upstanding base and a bracket arm extending laterally of the base, a pair of substantially vertical and parallel shafts carried by the bracket and projecting therebelow, at least the peripheral portion of each wheel being electrically conductive, means permitting movement of one wheel toward and away from the other wheel, resilient means for normally and yieldingly urging said one wheel toward said other wheel, means including the wheels for creating a high frequency electric field between said peripheral portions of the wheels, and driving means electrically insulated at least in part from the last mentioned means for imparting intermittent and simultaneous rotation to the wheels, said driving means including a continuously rotating member and at least one oscillatory element operatively connected to the rotating member and the shafts.

2. In apparatus for uniting work consisting of a plurality of parts arranged in layers, at least one of which parts is thermoplastic, the combination comprising means for engaging and advancing the work and for delivering a high frequency electrical current thereto, said means including a pair of wheels normally rotatable about substantially parallel axes and having peripheral portions disposed in cooperative relation adapted to receive the work therebetween; means permitting movement of one wheel toward and away from the other wheel; resilient means for normally and yieldingly urging said one wheel toward said other wheel; means for moving said one wheel away from said other wheel against the action of the resilient means; means for imparting intermittent rotation to at least one of the wheels, said last-mentioned means including a rotary driving unit and a mechanism for translating continuous rotation of the driving unit into successive intermittent increments of rotary movement of said last-mentioned wheel; means for generating a high frequency electrical current; and means for connecting said generating means with said first-mentioned means whereby a high frequency field is created in the region of the cooperating portions of the wheels.

3. In apparatus for uniting work consisting of a plurality of parts arranged in layers, at least one of which parts is thermoplastic, the combination comprising means for engaging and advancing the work and for delivering a high frequency electrical current thereto, said means including a pair of spaced wheels normally rotatable about substantially parallel axes and having portions disposed in cooperative relation adapted to receive the work therebetween; means permitting movement of one wheel toward and away from the other wheel; resilient means for normally and yieldingly urging said one wheel toward said other wheel; means for moving said one wheel away from said other wheel against the action of the resilient means; means for imparting simultaneous and intermittent rotation to both of the wheels, said last-mentioned means including a rotary driving unit and a mechanism for translating continuous rotation of the driving unit into successive intermittent increments of rotary movement of both wheels; means for generating a high frequency electric current; and means for connecting said generating means with said wheels whereby a high frequency field is created between the wheels.

4. In apparatus for uniting work consisting of a plurality of parts arranged in layers, at least one of which parts is thermoplastic, the combination comprising a housing including an upstanding base and a bracket arm extending laterally of the base, a pair of substantially vertical and parallel shafts carried by the bracket arm and projecting therebelow, a wheel secured to the lower part of each shaft and rotatable therewith, said wheels having their peripheral portions disposed in spaced cooperative relation adapted to receive the work therebetween, means permitting movement of one wheel toward and away from the other wheel, resilient means for normally and yieldingly urging said one wheel toward the other wheel, means for moving said one wheel away from the other wheel against the action of the resilient means, rotary driving means carried by the housing to the side thereof remote from the bracket arm, means disposed within the housing and operatively connected to the driving means and to the shafts for converting continuous rotation of the driving means to intermittent and simultaneous rotation of both wheels, said last-mentioned means being adjustable from the exterior of the housing to vary the length of intermittent movement of the wheels, means for generating a high frequency electric current, and means for connecting said generating means with said wheels whereby a high frequency field is created between the peripheral portions of the wheels.

HAROLD J. LE VESCONTE.

REFERENCES CITED

The following references are of record in the file of this patent:

UNITED STATES PATENTS

| Number | Name | Date |
| --- | --- | --- |
| 1,438,867 | Schroder | Dec. 12, 1922 |
| 1,583,906 | Von Henke | May 11, 1926 |
| 2,043,749 | Hacklander | June 9, 1936 |
| 2,324,068 | Crandell | July 13, 1943 |

OTHER REFERENCES

Hoyler, "An Electronic 'Sewing Machine,'" Electronics, August, 1943. Pages 90-93, 160, 162, 164, 166 and 168 (particularly pages 91 and 92). Copy in Scientific Library. (Reprint in Division 60.)